United States Patent [19]

Sharkey et al.

[11] Patent Number: 5,350,526

[45] Date of Patent: Sep. 27, 1994

[54] FILTRATION APPARATUS AND METHOD FOR REMOVING PARTICULATE CONTAMINANTS FROM COMMERCIAL LAUNDRY WASTE WATER

[75] Inventors: James P. Sharkey, 106 Cambon Ave., St. James, N.Y. 11780; Richard Bonasera, Smithtown, N.Y.

[73] Assignee: James P. Sharkey, St. James, N.Y.

[21] Appl. No.: 996,777

[22] Filed: Dec. 23, 1992

[51] Int. Cl.⁵ .................. B01D 37/00; B01D 29/62; B01D 29/64
[52] U.S. Cl. ................................. 210/791; 210/117; 210/323.2; 210/332; 210/342; 210/346; 210/347; 210/383; 210/386; 210/407
[58] Field of Search ............... 210/106, 108, 117, 138, 210/323.2, 332, 337, 340, 342, 346, 347, 383, 386, 393, 397, 408, 407, 767, 791, 796, 797, 413; 209/381, 382

[56] References Cited

U.S. PATENT DOCUMENTS

| | | | |
|---|---|---|---|
| 2,480,320 | 8/1949 | Carrier | 210/332 |
| 3,557,955 | 1/1971 | Hirs | 210/796 |
| 4,213,861 | 7/1980 | Müller et al. | 210/797 |
| 4,289,630 | 9/1981 | Schmidt, Jr. et al. | 210/323.2 |
| 4,322,293 | 3/1982 | Morgan, Jr. | 210/232 |
| 4,591,446 | 5/1986 | Müller | 210/797 |

Primary Examiner—Robert A. Dawson
Assistant Examiner—Sun Uk Kim
Attorney, Agent, or Firm—Galgano & Burke

[57] ABSTRACT

A filtration apparatus specifically intended for removing particulate contaminants from commercial laundry waste water has at least one porous mesh-like filter bag coupled between an inlet manifold for receiving waste water containing particulate contaminants and an outlet manifold for discharging the particulate contaminants separated from the waste water. The filter bag is agitated by a paddle, so as to prevent the mesh-like material of the filter bag from being clogged. Also disclosed is a method for filtering waste water containing particulate contaminants.

9 Claims, 2 Drawing Sheets

FILTRATION APPARATUS AND METHOD FOR REMOVING PARTICULATE CONTAMINANTS FROM COMMERCIAL LAUNDRY WASTE WATER

BACKGROUND OF THE INVENTION

The present invention relates generally to a liquid filter. More particularly, this invention relates to filtration apparatus for removing particulate contaminants from commercial laundry waste water and a method for accomplishing the same.

Many state and local governments across the country have enacted environmental regulations or expanded existing regulations to limit the amount of particulate contaminants discharged into the environment. The regulations are generally directed toward commercial enterprises which create various wastes as a by-product of manufacture or of doing business. The commercial laundry industry and commercial laundromats, in particular, are affected by regulation limiting the amount of suspended solids or particulate contaminants contained in waste water that is discharged into the ground water and/or municipal sewage system. Particulate contaminants in commercial laundry waste water generally consists of lint, hair, dirt and soap scrim. To meet these stricter environmental regulatory requirements a certain amount of the particulate contaminants in the waste water must be removed.

Removal of particulate contaminants is generally accomplished by filtering the liquid. A number of filter devices have been invented to remove particulate contaminants from liquids. For example, U.S. Pat. No. 4,322,293 by Morgan discloses a filtering device having a housing which supports and suspends a number of multiple filter elements which have a single open upper end which accepts the liquid to be filtered. Once the filter is clogged or full the housing must be opened and the filters removed and replaced or cleaned.

Another example, U.S. Pat. No. 4,591,446 by Muller discloses a pressurized filtering device in which the liquid to be filtered transfers through a plurality of vertically suspended tube-like filter elements wherein particulate contaminants accumulate on the outer surface to the filter elements. A second operation of rinsing the outer surface of the tube-like filter elements with a combination of a rinsing liquid and pressurized air removes the particulate contaminants accumulated on the outer surface of the filter element for subsequent discharge of the contaminants out a separate opening at the bottom of the device.

In both of the above disclosures once filtration of the liquid is undertaken the effective filtering capability of the filter device decreases due to clogging of the filter. To satisfy the needs of the laundry industry a filtering apparatus should be capable of accepting a large flow rate of waste water and capable of removing the relatively small suspended particulate contaminants.

SUMMARY OF THE INVENTION

It is an object of the present invention to provide an improved filtration apparatus and method which permits the filtering of a large and continuous flow of waste liquid.

It is also an object of the present invention to provide an improved filtration apparatus which minimizes clogging of the filter elements.

It is another object of the present invention to provide such a filtration apparatus which contains filter elements that do not require removal or replacement once filled with particulate contaminants.

It is still another object of the present invention to provide such a filtration apparatus which is automated wherein the collected particulate contaminants can be manually or automatically flushed from the apparatus permitting the continued filtering of waste water.

It is still yet another object of the present invention to provide such a filtration apparatus which is easily and inexpensively manufactured, highly efficient in operation, and which requires little lifetime maintenance.

Certain of the foregoing and related objects are readily obtained in a filtration apparatus having inlet manifold means for receiving waste water containing particulate contaminants and an outlet manifold means for discharging the collected particulate contaminants. Mechanical filter means, preferably at least one porous mesh-like filter bag, is coupled between the inlet and outlet manifold means and agitation means prevents the mesh-like material of the filter bag from being clogged.

In a preferred embodiment of the invention, the filter means comprises an inner filter bag and a outer filter bag. Most desirably, the agitation means comprises a rotatable paddle means which consists of a plurality of cylindrical rotatable tubes.

In a particularly preferred embodiment of the invention, the filtration apparatus is mounted in a container and includes discharge means for removing the collected particulate contaminants. The discharge means includes a discharge valve attached to the outlet manifold and an injection valve disposed on the inlet manifold for introducing a flushing fluid. Most advantageously, solenoids are connected to a timer for automatically controlling the opening and closing of the valves for cleaning the filter elements.

Certain of the foregoing and related objects are also attained in a method of filtering waste water containing particulate contaminants embodying the present invention which includes the steps of introducing the waste water into at least one filter element and permitting the waste water to filter through the filter element to separate the particular contaminants from the waste water, agitating the filter element to prevent the fiber element from being clogged, and discharging the particular contaminants from the filter element.

BRIEF DESCRIPTION OF THE DRAWINGS

Other objects and features of the present invention will become apparatus from the detailed description considered in connection with the accompanying drawings, which disclose one embodiment of the invention. It is to be understood that the drawings are to be used for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
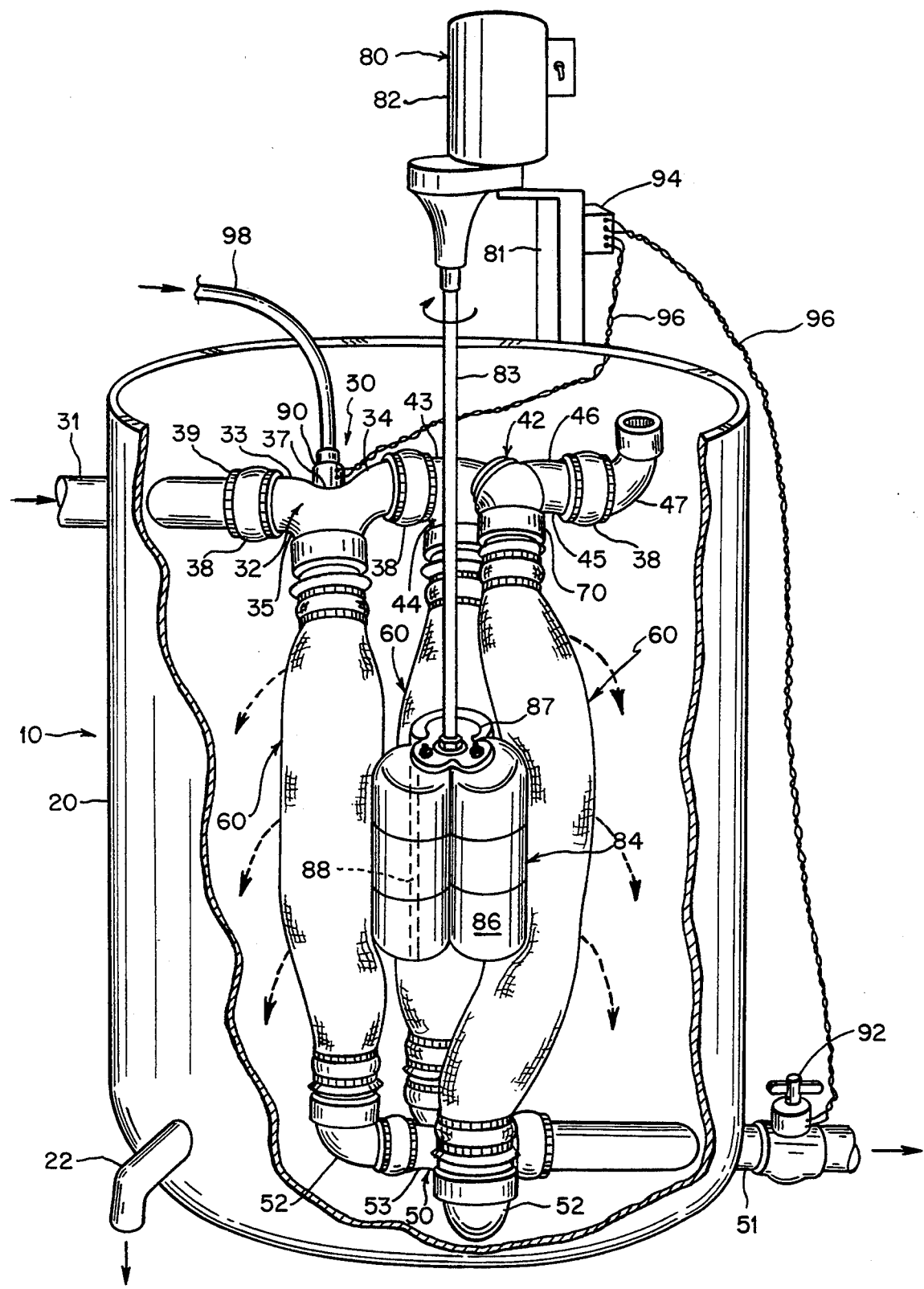
FIG. 1 is a fragmentarily-illustrated perspective view of the filtration apparatus embodying the present invention with portions broken away to show internal construction.

Turning now in detail to the drawings, and in particular to FIG. 1, therein illustrated is a filtration apparatus 10 embodying the present invention, which is particularly adaptable to the discharge from a number of commercial washing machines for removing the particulate contaminants, such as lint, hair, dirt and soap scum, resulting from the washing of laundry. Filtration apparatus 10 generally includes a container 20, an inlet manifold 30, an outlet manifold 50, a plurality of filter elements 60, an agitator 80, an injector valve 90 and a discharge valve 92.

Referring again to FIG. 1, container 20 surrounds the filter elements 60 and has an opening in the side wall near the top for insertion of an inlet tube 31 for introducing the waste water to be filtered and an opening in the side wall near the bottom for an outlet tube 51 for discharge of the filtered particulate contaminants. A drain spout 22 disposed in the side wall near the bottom discharges the collected filtered water after having passed through filter elements 60. Drain spout 22 can be positioned over a floor drain or connected to a conduit for discharge of the filtered water into the environment or sewerage system. Preferably, the container is a 50 gallon plastic drum with a lid (not shown) so that the entire filtration apparatus 10 is a self contained unit.

Inlet manifold 30 attaches to the inlet tube 31 for dividing and conducting the volume of waste water into the various filter elements 60. In addition, inlet manifold 30 supports and suspends filter elements 60 substantially vertically in a balanced circular configuration which reduces vibration of filter elements 60 when agitated as more fully explained below. Specifically, inlet manifold 30 includes T-shaped plastic (PVC) tube fittings 32 and 42, rubber hose connectors 38 and hose clamps 39. Fitting 32 has a first port 33 attached to inlet tube 31 by connector 38 and a pair of clamps 39, a second port 34 connected to fitting 42 via connector 38 and clamps 39, and a downwardly extending port 35 having external threads 36 for connection to filter element 60 (best shown in FIG. 2). A port 37 disposed on the top of fitting 32 attaches to injector valve 90 for introduction of water under pressure for flushing particulate contaminants which have accumulated in the filter elements 60.

Fitting 42 has a port 43 attached to port 33 of fitting 32 and two downwardly extending ports 44 and 45 also having external threads (not shown in FIG. 1) for connection to filter elements 60. An additional port 46 is attached via connector 38 and clamps 39 to an upstanding plastic tube elbow 47 which allows for an emergency by-flow of waste water, if the system should fail due to clogging of the filters and blockage of the waste water flow.

Outlet manifold 50 is attached to the bottom ends of filter elements 60 and includes fitting 52, having four ports 53, three elbow-shaped pipes 54, having external threads 56 (best shown in FIG. 2) on one end, rubber hose connectors 38 and hose clamps 39. Elbow-shaped pipes 54 are connected to three ports of fitting 52 via connector 38 and a pair of clamps 39 so that the threaded ends 56 extend vertically upward in corresponding relationship to the downwardly extending ports 33, 34 and 35 of the inlet manifold 30. The forth port 53 is connected to discharge pipe 51, which extends through container 20 via connector 38 and a pair of clamps 39.

Figure 2:
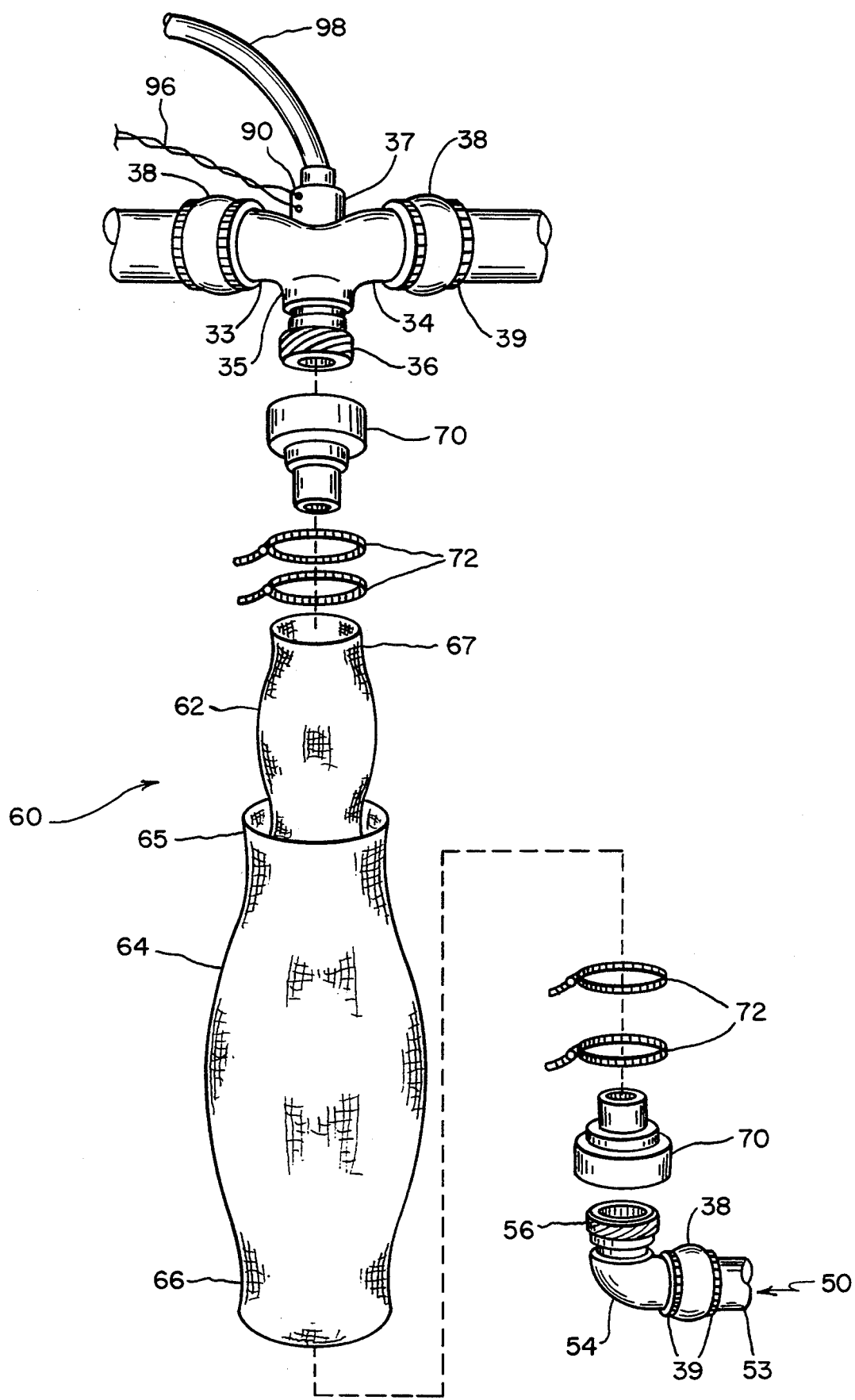
FIG. 2 is an exploded perspective view showing details of the filter element and manifolds.

Referring to FIG. 2, each of the three filter elements 60 are tubular in shape and are positioned in a substantially vertical position between the upper inlet manifold 30 and the lower outlet manifold 50. Filter elements 60 include an inner filter bag or tube 62 for trapping the particulate contaminants, an outer filter bag or tube 64 for protection of the inner filter bag 52 when agitated, plastic end caps or couplings 70 and pipe clamps 72. Inner filter bag 62 retains particulate contaminants such as lint, hair, dirt, soap scum and is preferably constructed from Nylon monofilament, relatively fine mesh for trapping contaminants having a particle size greater than, e.g., 25 microns, or preferably, greater than 5 microns. Preferably, the outer filter bag 64 is constructed from a vinyl coated, polyester, relatively coarse mesh construction. The purpose of the outer filter bag is not to trap contaminants but to allow filtered waste water therethrough and to serve as a protective sleeve to protect the inner filter bag from abrasion damage, as described in greater detail below. In addition, both filter bags 62 and 64 are bowed in the middle thereby increasing the overall effective surface area of the mesh and thus the efficiency of the filtration apparatus.

The upper ends 65 and 67 of the filter bags 64 and 62, respectively, attach to plastic couplings 70 by a pair of pipe clamps 72. The upper cup-shaped ends of couplings 70 are internally threaded (not shown) for corresponding engagement with external threads 36 on inlet manifold 30. Similarly, the lower ends 66 of the outer filter bag 64 and the lower end of inner filter bag 62 (not shown) are attached to coupling 70 which further attaches to outlet manifold 50 via threaded ends 56 of pipe 54.

Referring again to FIG. 1, agitator 80 prohibits the particulate contaminants from clogging the fine mesh of inner filter bag 62 by constantly agitating the bags during operation. Agitator 80 includes a motor 82, a rotatable drive shaft 83 and a paddle 84. Motor 82 is supported by a bracket 81 attached to a support (not shown) above the barrel 20 so that it is centrally disposed between the filter elements 60. Preferably, the motor is set to turn at a rate of approximately 1700 revolutions per minute and has a shut off in the event of overheating. Shaft 83 has a upper end which attaches to the motor 82 and lower end which attaches to the paddle 84.

Paddle 84 consists of three cylindrical tubes or paddle elements 86 that connect to the shaft 83 by a pair of flanges 87 (lower flange not shown in FIG. 1). Flange 87 attached to shaft 83 and has three holes through which three smaller shafts 88 (one of which is shown in dotted line in FIG. 1) freely support cylinder tubes 86. The tubes are freely rotatable on shafts 88. Preferably, the cylindrical tubes 86 are formed from either rigid foam or vinyl plastic.

Removal of the particulate contaminants by the filters may be accomplished manually or preferably by the coordination of the injector valve 90 and the discharge valve 92. Injector valve 90 is disposed on the top of inlet manifold 30 for introduction of water under pressure from a suitable source (not shown). The injected water is used to flush the particulate contaminants accumulated in the filter elements. Discharge valve 92 is attached to outlet tube 51 and normally closed so that the waste water is forced through the filter elements 60 to the interior of tank 20 and out drain 22. When the filter elements 60 fill up with excessive particulate contaminants, valves 90 and 92 can be opened and the accumulated particulates can be flushed out. Valves 90 and 92 can be activated manually. Preferably the valves are operated by a conventional solenoid connected by a wire 96 to a conventional timer 94 for automatic periodic flushing and discharge of the collected particulate contaminants.

OPERATION

The operation of the present invention will be explained with respect to FIG. 1. Waste water from washing machines is introduced into the filtration apparatus 10 by the inlet tube 31 as shown by the arrow. The volume of the waste water is divided by the inlet manifold 30 so as to equally enter the upper end of the three filter elements 60. The waste water is permitted to filter through the filter elements 60 (dashed arrows) since the waste water is prohibited from exiting the outlet manifold 50 by discharge valve 92. Paddle 84, located in the center of the filter elements, is connected by shaft 83 to a motor 82 which agitates the filter elements 60 by three cylindrical tubes 86 impinging against the surface of the filter bags 62 and 64 so as to keep the collected particulate contaminants from accumulating on the inner surface of the bags and instead settle in output manifold 50 or the lower portion of the inner filter bag 62 thus preventing the filter elements from being clogged.

As previously noted, removal of the accumulated particulate contaminants is accomplished by opening discharge valve 92 attached to the outlet manifold 50 and opening injector valve 90 on the inlet manifold for introducing a liquid by hose 98 for flushing the collected particulate contaminants out. The removal can be performed either manually or automatically through the use of solenoids and timer 94.

Various modifications can be made as will be apparent to those skilled in the art. For example, the inlet and outlet manifolds can be of a single piece construction formed to the correct configuration reducing the need for hoses and clamps. However, the various parts shown in the drawing are commercially available so that the unit can be made economically.

In addition, although the paddle preferably consists of the three tube construction shown, as it provides good agitation with very low impact and thus less abrasion to the filter bags, other types of paddles or agitation means could possibly be used to agitate the filter bags. Moreover, the number and size of filter bags, the materials from which they are made, and the mesh-size thereof can be modified to suit the particular application, which will be dependent on such factors as the amount and consistency of the waste solids, water flow rate, etc.

Thus, while only one embodiment of the present invention have been shown and described, it is obvious that many changes and modification may be made thereunto without departing from the spirit and scope of the invention.

What is claimed is:

1. A filtration apparatus comprising:
   inlet manifold means for receiving waste water containing particulate contaminants;
   outlet manifold means for discharging particulate contaminants separated from the waste water;
   mechanical filter means coupled between and interconnecting said inlet and outlet manifold means, said filter means having a first inlet end directly connected to said inlet manifold means for receiving waste water, and an outlet end directly connected to said outlet manifold means for discharging contaminants, said filter means including a pair of porous mesh filter tubes arranged one within the other to define an inner tube and an outer tube, said inner tube being of fine mesh and said outer tube being of coarse mesh; and
   agitating means for agitating said tubes so as to prevent said mesh of said tubes from being clogged.

2. The filtration apparatus according to claim 1, additionally including a container in which said filtration apparatus is housed having an outlet for the discharge of filtered waste water.

3. The filtration apparatus according to claim 1, wherein said agitation means comprises rotatable paddle means.

4. The filtration apparatus according to claim 3, wherein said rotatable paddle means comprises a plurality of rotatable cylindrical paddle elements.

5. The filtration apparatus according to claim 4, further including means for removing the particulate contaminants separated from the waste water.

6. The filtration apparatus according to claim 5, wherein said means for removing the particulate contaminants separated from the waste water include a discharge valve attached to said outlet manifold means and an injection valve disposed on said inlet manifold means for introducing a flushing fluid.

7. The filtration apparatus according to claim 6, further including solenoids operatively coupled to said injection and discharge valves to effect opening and closing thereof and a timer electrically coupled to said solenoids to effect activation and deactivation thereof.

8. A method of filtering waste water containing particulate contaminants comprising the steps of:
   introducing said waste water into a filtration apparatus having inlet manifold means for receiving waste water containing particulate contaminants, outlet manifold means for discharging particulate contaminants separated from the waste water, and mechanical filter means coupled between and interconnecting said inlet and outlet manifold means, said filter means having a first inlet end directly connected to said inlet manifold means for receiving waste water, and an outlet end directly connected to said outlet manifold means for discharging contaminants, said filter means including a pair of porous mesh filter tubes arranged one within the other to define an inner tube and an outer tube, said inner tube being of fine mesh and said outer tube being of coarse mesh, said waste water being introduced into said inlet manifold means;
   filtering said waste water through said filter means to separate the particulate contaminants from the waste water, said waste water being fed directly from said inlet manifold means to said inlet end of said filter means;
   agitating said filter means by impinging upon said filter means so as to prevent said mesh of said inner tube from being clogged; and
   discharging the particulate contaminants separated from the waste water from said filter means via said outlet end of said filter tube, thereby discharging said contaminants directly to said outlet manifold means.

9. A filtration apparatus comprising:
   inlet manifold means for receiving waste water containing particulate contaminants;
   outlet manifold means for discharging particulate contaminants separated from the waste water;
   mechanical filter means coupled between, and interconnecting said inlet and outlet manifold means, said filter means having a first inlet end directly connected to said inlet manifold means for receiving waste water, and an outlet end directly connected to said outlet manifold means for discharging contaminants, said filter means including a filter element having at least one porous mesh filter tube; and agitating means for agitating said tube by impinging against the surface of the filter tube, so as to prevent said mesh of said tube from being clogged.

* * * * *